United States Patent Office 3,018,772
Patented Jan. 30, 1962

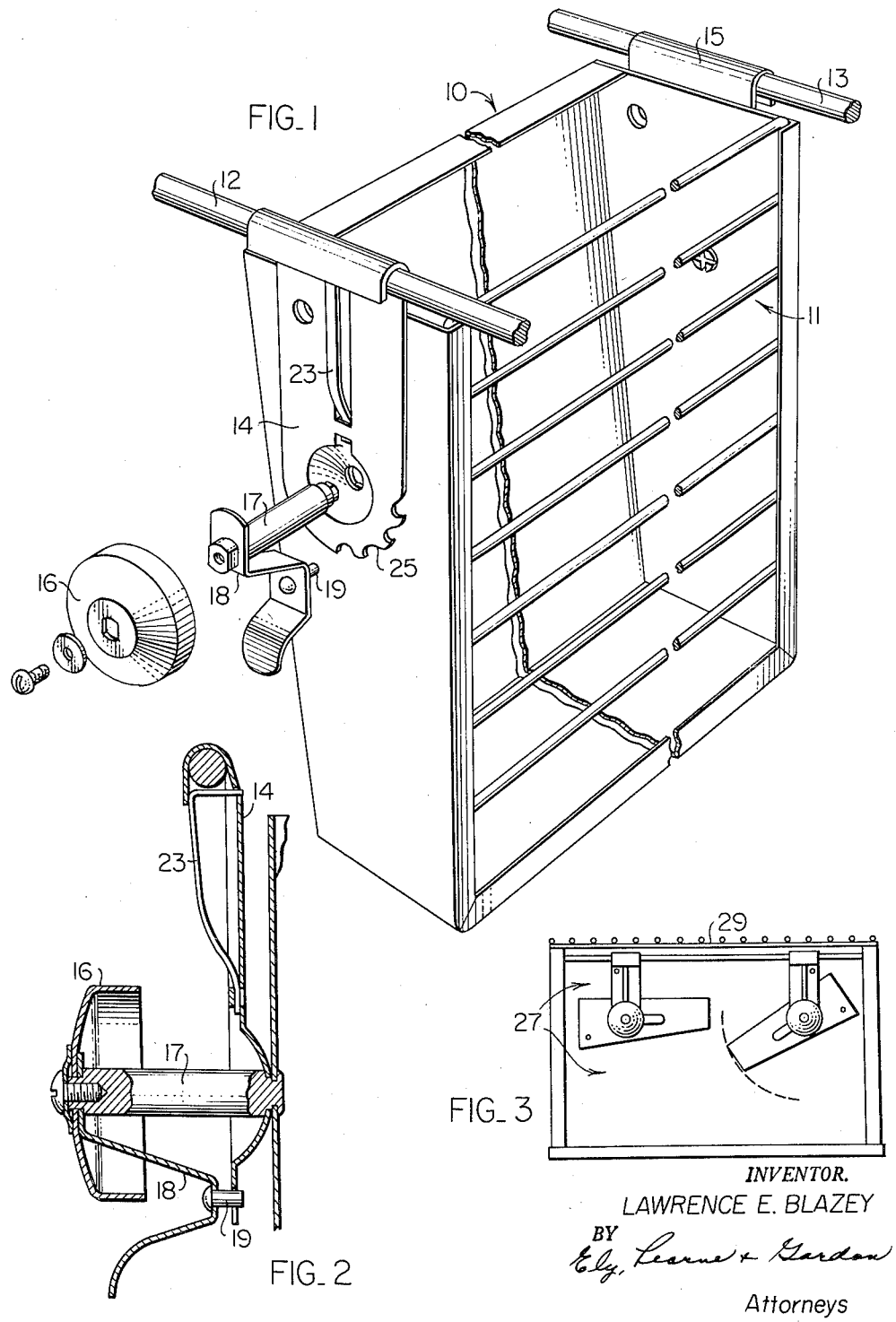

3,018,772
CHARCOAL BURNER MEANS FOR COOKING GRILLS
Lawrence E. Blazey, Bay Village, Ohio, assignor to Terra Industries, Inc., Cleveland, Ohio, a corporation of Ohio
Filed May 26, 1958, Ser. No. 737,719
2 Claims. (Cl. 126—25)

This invention relates to adjustable barbecues and is particularly adapted to barbecues involving knock-down prefabricated grills, but is not limited thereto in all its aspects.

An object of the invention is to provide a charcoal burner arrangement having greater versatility than those heretofore provided. The invention provides a grill where a variety of cooking can be done by simple adjustments of a pair of charcoal baskets. A structural feature of the invention is the provision of baskets which are both pivotally mounted and horizontally translatable. The following description of one embodiment of the invention is set forth by way of example.

In the accompanying drawings:

FIGURE 1 shows a basket of the type contemplated by the invention suspended from supporting means at the two upper sides (which may be the front and rear) of a barbecue zone. It will be understood that the top grill of the barbecue is located immediately above the illustrated horizontal rods.

FIGURE 2 is a detail sectional view showing a part of the apparatus shown in FIGURE 1.

FIGURE 3 is a view illustrating various adjustments of a pair of baskets of the type shown in FIGURE 1.

Each of the charcoal baskets may comprise a receptacle generally indicated by the reference numeral 10 at least one side 11 of which is opened to expose burning charcoal held within the receptacle. Each basket is filled with charcoal from the top, which also is open. The basket is suspended from the rods 12 and 13 at the upper sides of a barbecue zone 27 (FIGURE 3). Usually it will be desirable that the baskets be suspended from the front and rear sides of the barbecue zone and to this end, the elements of the front and rear sides of the barbecue zone may comprise merely horizontal rods as illustrated. The basket 10 is supported by a front strap 14 and a rear strap 15. The rear strap may be freely pivotally attached to the rear side of the basket 10. The front side is pivotally attached to the strap 14 through a detent arrangement so that the angular position of the basket 10 may be fixed at one or several desired settings. To this end the strap 14 may be notched as at 25 and the basket 10 may be provided with a handle 16 which is fixed to the basket 10 by a shaft 17 and which is provided with a detent strap of springy metal 18. The strap 18 carries a detent rivet 19 which is adapted to engage in the notches 15 and which may be conveniently lifted from detent engagement by grasping the lower curved end of the strap 18 with the index finger while manipulating the knob 16 with the hand to change the angular position of the basket to the desired degree.

The strap 14 may be prevented from being accidentally lifted out of engagement with the rod 12 by means of a retaining spring 23 which normally is in the retaining position shown in FIGURES 1 and 2 but which may be forced to retracted position (to the right, as shown in FIGURE 2) to be brought out of retaining position, thereby allowing the strap 14 to be raised out of engagement with the rod 12.

The usual top grill above the barbecue zone 27 is indicated in FIGURE 3 by the reference numeral 29.

A pair of baskets are provided in a barbecue as illustrated in FIGURE 3. The baskets are both identical to the basket shown in FIGURE 1, with the exception that one of the two baskets is substantially a mirror image of the other so that they are adapted to be rotatably adjusted in opposite senses. Thus, both the baskets may be positioned in a horizontal position for horizontal broiling and the like over a large expanse of the top grill with uniform heat. For heating adjustment when cooking on the top grill, the baskets may be rotated downwardly from the horizontal position to the first, second, third or higher step positions of the detent members 15, 18, 19. Normally it will be desirable to rotate both baskets downwardly the same amount to uniformly adjust the heat through the center portion of the top grill, but in some cases the unusual flexibility of the apparatus may be of advantage in that it may be desirable to position the two baskets at different angular positions so as to adjust local heats on the top grill in special ways for the particular circumstances. In any event, the angular adjustability from the horizontal provides a highly desirable heat control for top grill cooking.

In vertical broiling or barbecuing the pair of baskets may be translated toward and away from each other to obtain a very desirable adjustment of heat. In such cooking operations, a conventional vertical grill holder or rotisserie shaft (not shown) is positioned between the baskets. Of course during such cooking items which require only relatively concentrated local heat over a small area may also be cooked on the top grill, such items being positioned directly above the open top ends of the baskets 10.

Accordingly, it will be understood that I have provided a charcoal basket arrangement for barbecues which is unusually versatile and at the same time is relatively simple. In effect I provide a wide range of heat adjustment for both horizontal and vertical cooking operations. This is done by means of the pair of translatable and pivotally mounted baskets 10. While the illustrated embodiment of the invention has been described in some detail by way of example, it will be understood that the invention is not limited to all the described details. The scope of the invention is defined in the following claims.

What is claimed is:

1. Outdoor grill apparatus comprising means defining a barbecue zone, strap supporting means at opposite upper sides of said zone, said apparatus including two pairs of straps with the straps of each pair depending from said strap supporting means at opposite upper sides of said zone, said straps each being horizontally translatable along the side from which it depends, a pair of charcoal baskets within the zone, each basket being hangingly and pivotally supported between its own pair of said two pairs of straps, and detent means between each of said baskets and one of the straps from which it depends for defining horizontal, intermediate and vertical positions of each basket.

2. Outdoor grill apparatus comprising means defining a barbecue zone, a pair of charcoal baskets within said zone, a plurality of pivot mounting means respectively mounting each of said baskets for adjustable pivoting movement around its own one of a pair of respectively spaced horizontal axes, said baskets being supported solely by said pivot mounting means, said pivot mounting means being translatable in horizontal directions transverse to said horizontal axes of pivoting movement of the baskets whereby a wide range of heat adjustment over large areas both within the barbecue zone and on a grill above the barbecue zone may be effected.

References Cited in the file of this patent
UNITED STATES PATENTS
261,870    Perkins _____ Aug. 1, 1882
(Other references on following page)

UNITED STATES PATENTS

| | | |
|---|---|---|
| 301,705 | Fischer | July 8, 1884 |
| 358,555 | Hubbell, et al. | Mar. 1, 1887 |
| 505,433 | Boggs | Sept. 26, 1893 |
| 1,124,551 | Stumpf | Jan. 12, 1915 |
| 2,398,508 | Shoemaker | Apr. 16, 1946 |
| 2,441,190 | Fuller | May 11, 1948 |
| 2,619,951 | Kahn | Dec. 2, 1952 |
| 2,709,996 | Tescula | June 7, 1955 |
| 2,734,499 | Lombardi | Feb. 14, 1956 |
| 2,821,187 | Tescula | Jan. 28, 1958 |
| 2,885,950 | Stoll et al. | May 12, 1959 |
| 2,891,465 | Rogge | June 23, 1959 |

FOREIGN PATENTS

| | | |
|---|---|---|
| 547,764 | Italy | Sept. 14, 1956 |